W. W. MORRAL
Nov. 26, 1929. CORN HUSKING MACHINE Re. 17,504
Original Filed Jan. 23, 1926 4 Sheets-Sheet 1
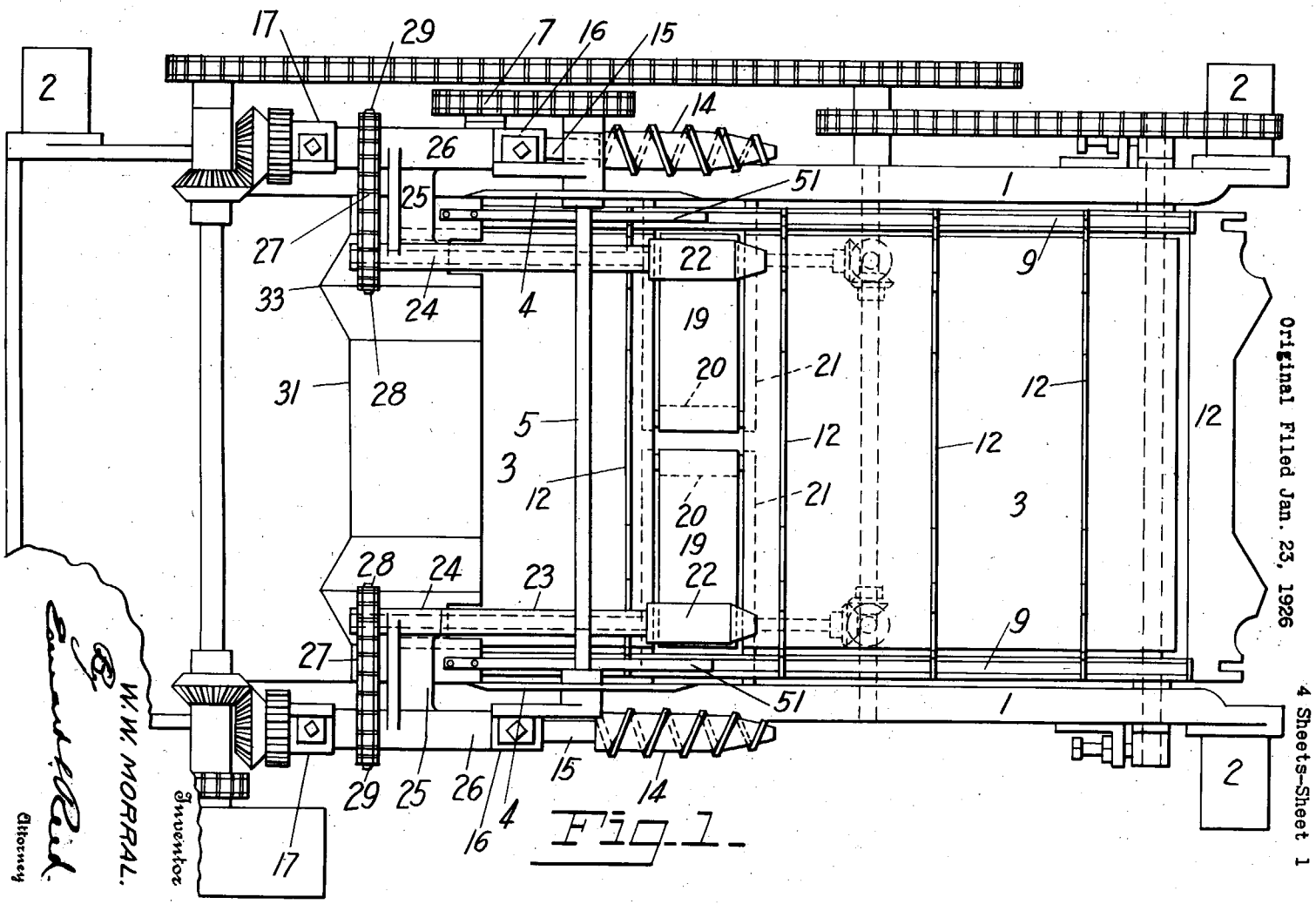
Inventor
W. W. MORRAL.
By Edward F. Reid
Attorney Nov. 26, 1929. W. W. MORRAL Re. 17,504
CORN HUSKING MACHINE
Original Filed Jan. 23, 1926 4 Sheets-Sheet 2
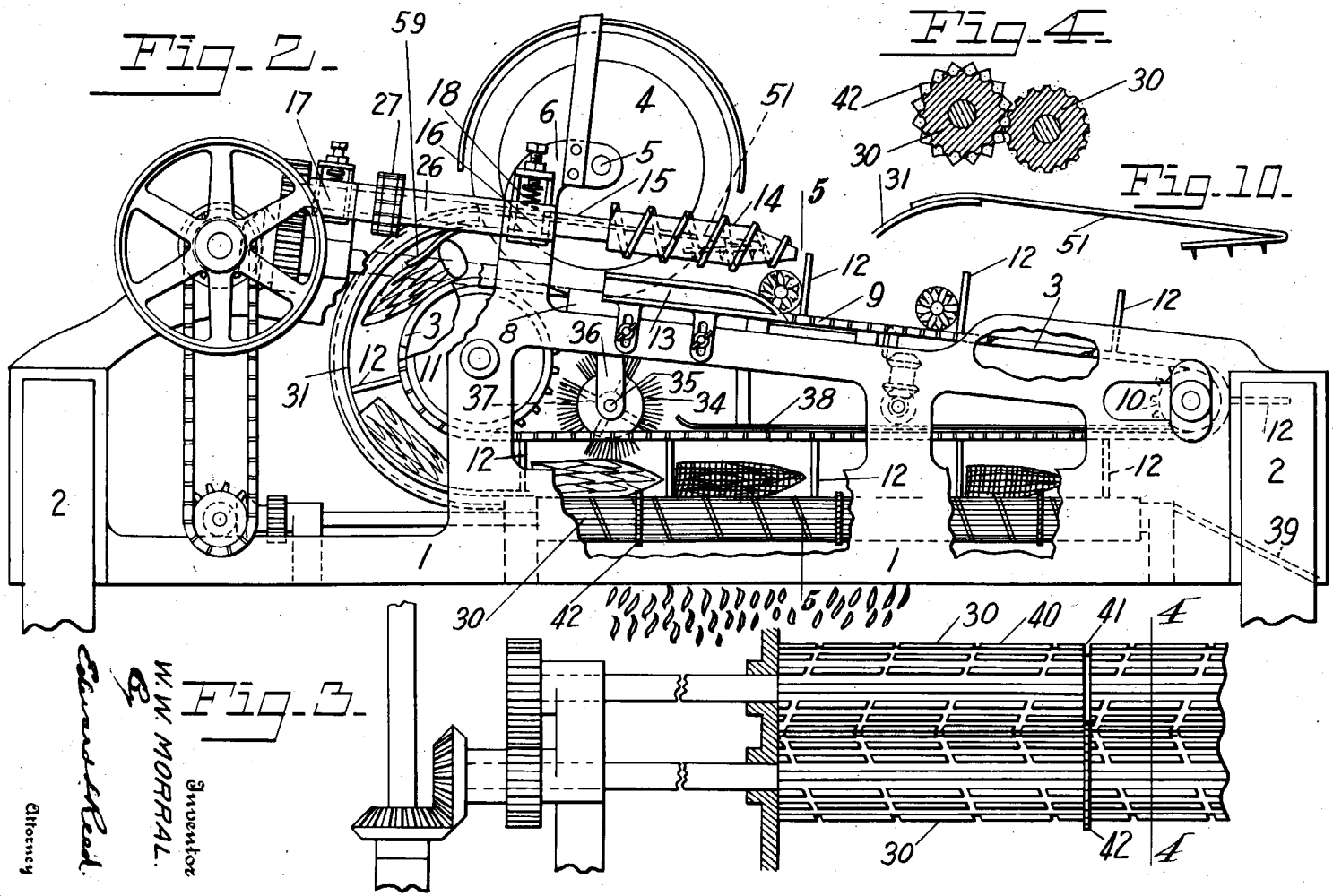

Nov. 26, 1929. W. W. MORRAL Re. 17,504

CORN HUSKING MACHINE

Original Filed Jan. 23, 1926 4 Sheets-Sheet 3

Inventor
W. W. MORRAL.
By
Edward A. Reed.
Attorney

Nov. 26, 1929. W. W. MORRAL Re. 17,504

CORN HUSKING MACHINE

Original Filed Jan. 23, 1926 4 Sheets-Sheet 4

Inventor
W. W. MORRAL.

By Edward L. Reed.

Attorney

Reissued Nov. 26, 1929

Re. 17,504

UNITED STATES PATENT OFFICE

WILLIAM W. MORRAL, OF MORRAL, OHIO, ASSIGNOR OF ONE-HALF TO SAMUEL R. MORRAL, OF MORRAL, OHIO

CORN-HUSKING MACHINE

Original No. 1,628,325, dated May 10, 1927, Serial No. 83,173, filed January 23, 1926. Application for reissue filed April 27, 1929. Serial No. 358,741.

This invention relates to corn husking machines and is designed more particularly for removing the butts from and husking green corn.

One object of the invention is to provide a husking machine adapted to remove the butts from ears of corn and then husk the same, which will be simple in its construction and compact in its arrangement.

A further object of the invention is to provide such a machine in which the husking rollers will extend lengthwise thereof and which will be provided with means for presenting the ears transversely of their length to the butt removing means and for presenting the same lengthwise to the husking rollers.

A further object of the invention is to provide such a machine having a plurality of pairs of husking rollers differently arranged with relation to the ears so as to more efficiently remove the husks.

A further object of the invention is to provide such a machine with an improved means for positioning the ear with relation to the butt removing device.

A further object of the invention is to provide such a corn husking machine which will have a large capacity, and to this end it is also an object of the invention to provide the machine with mechanism for operating simultaneously on two series of ears of corn.

Other objects of the invention will appear as the mechanism is described in detail.

Figure 5:
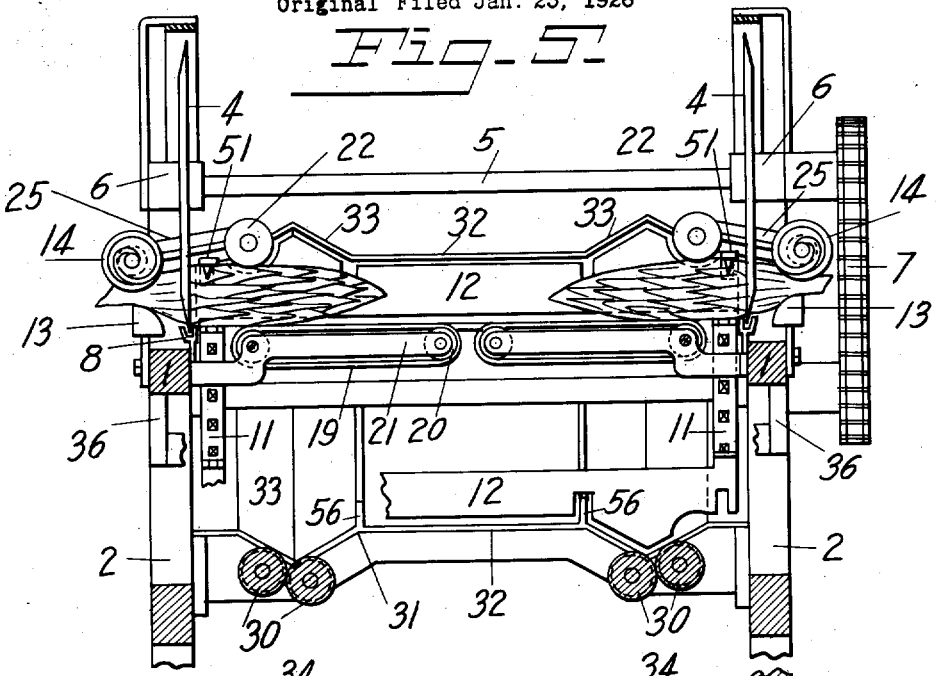
Figure 6:
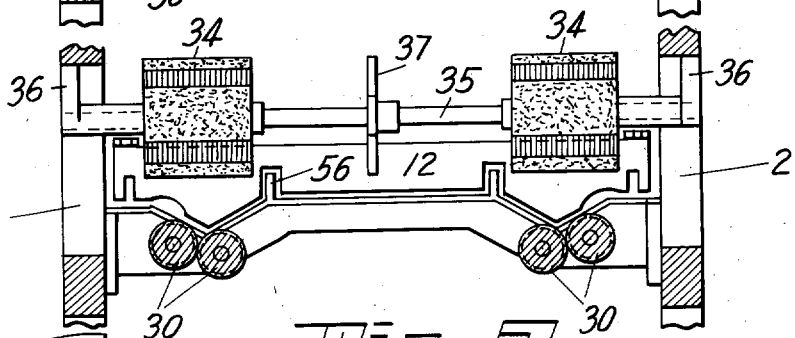
Figure 7:
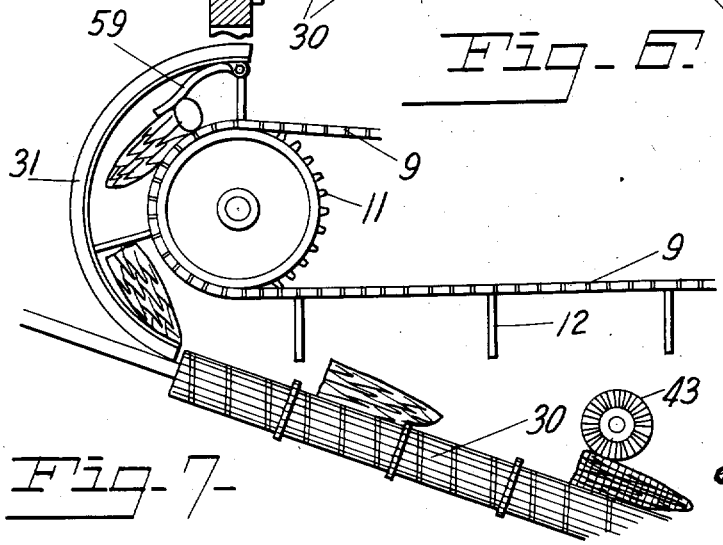
Figure 8:
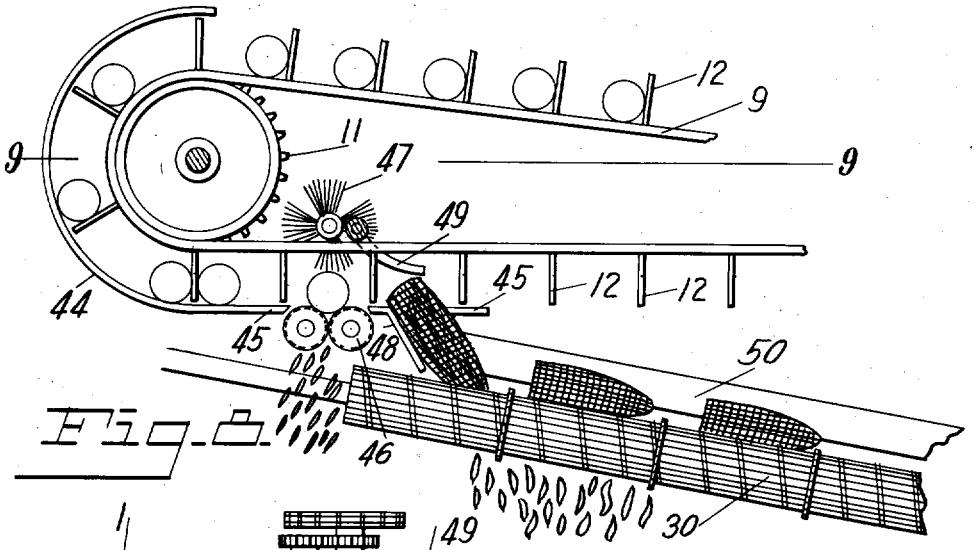
Figure 9:
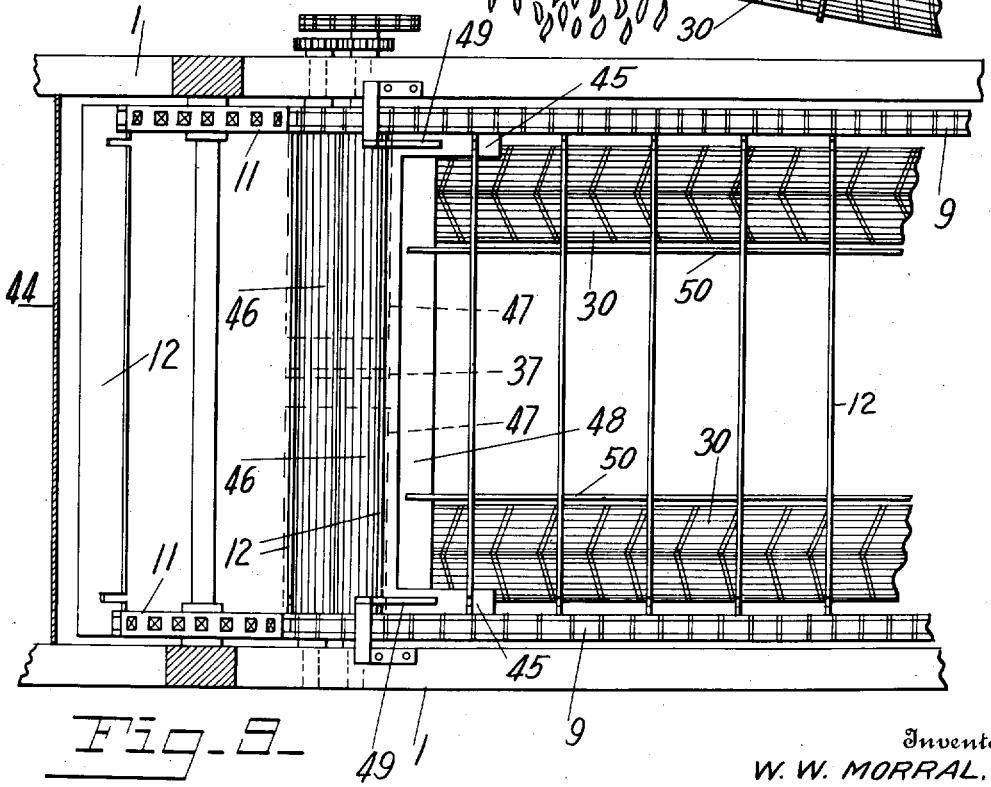

In the accompanying drawings Fig. 1 is a top plan view, partly broken away, of a machine embodying my invention; Fig. 2 is a side elevation, partly broken away, of the mechanism shown in Fig. 1; Fig. 3 is a plan view of a portion of one pair of husking rolls; Fig. 4 is a section taken on the line 4—4 of Fig. 3; Fig. 5 is a section taken on the line 5—5 of Fig. 2 with the brush omitted; Fig. 6 is a transverse section taken through the husking rollers of Fig. 2 and showing the brushes associated therewith; Fig. 7 is a side elevation of a portion of the machine showing a modified arrangement of the husking rollers; Fig. 8 is a vertical sectional view showing a further modification of the husking devices; Fig. 9 is a horizontal section taken on the line 9—9 of Fig. 8; and Fig. 10 is a detail view of one of the husk loosening devices.

In these drawings I have illustrated certain embodiments of my invention but it will be understood that these embodiments have been chosen for the purpose of illustration only and that the mechanism may take various form without departing from the spirit of the invention.

The machine here shown comprises a main frame 1, preferably mounted on standards 2 and having an ear supporting structure or table 3 on which the ears may be placed by hand, or otherwise, preparatory to the butting and husking operations. Arranged alongside of the table 3, near the discharge end thereof, is a butt removing device which, in the present instance, consists of a rotary cutter 4 mounted on a transverse shaft 5 which is journaled in brackets 6 carried by the main frame and is driven by a sprocket chain 7 from a suitable part of the driving mechanism. Cooperating with this rotary cutter is a cutter bar 8 mounted adjacent to the edge of the table and substantially in the plane thereof. The present machine comprises what is known as a double husker and to this end the butting and husking devices are shown in duplicate at the respective sides of the machine. Inasmuch as these devices are identical in their construction it will be necessary to describe but one of them and it will be understood that this description applies to both sets of devices.

The ears of corn which are placed upon the table 3 are fed to the butt removing device by means of a suitable conveyor which moves the ears along the table transversely to their length. Preferably this conveyor comprises a pair of sprocket chains 9 which extend about sprocket wheels 10 and 11 arranged at the respective ends of the table and so positioned that the upper stretches of the two sprocket chains will lie substantially in the plane of the table. The two chains are connected one to the other by means of cleats or flights 12 which extend across the table so as to travel over the same and engage the ears of corn and thus move the ears to the butt removing device.

The ears are properly positioned with relation to the butt removing device by means of a gaging device which engages the butt of the ear to determine its transverse position with relation to the cutter 4. As here shown, this gaging device comprises a fixed gaging bar 13 which is rigidly mounted on, but is vertically adjustable with relation to, the main frame and which is spaced laterally from the adjacent edge of the table. This gaging bar is here shown as having its inner portion curved to cause it to conform more or less to the shape of the butt of the ear and its forward end is tapered to guide the stem of the ear onto the upper portion thereof. Cooperating with this fixed gaging bar is a gaging roller 14 having a spiral rib extending from end to end thereof and also tapered at its forward end to facilitate the entrance of the stem of the ear between the same and the fixed gaging bar. This roller is spaced a short distance above the fixed bar and is carried by a shaft 15 mounted in suitable bearings 16 and 17 and having at its rear end geared connection with the driving mechanism. The driving mechanism is of such a character that the roller will be rotated at such a speed that the butt of the ear will be advanced during the butt severing operation, at substantially the same speed that the body of the ear is advanced, thus preventing any twisting of the ear which will cause it to bind on the cutter. Preferably the gaging roller is movable toward and from the fixed gaging bar to enable it to accommodate itself to butts of different sizes and to this end the bearings 16 and 17 are slidably mounted and are acted upon by springs 18 which tend to hold the same normally in its lowermost position but permit the roller to yield when an upward thrust is exerted thereon. Only a slight movement will be imparted to the bearing 17 and this will not be sufficient to disengage the driving gears.

The ear is moved transversely into engagement with the gaging device by means of a suitable transverse conveyor which, in the present instance, comprises an endless belt 19 mounted on drums 20 which are carried by brackets 21 secured to the main frame and so arranged that the upper stretch of the belt will lie in substantially the plane of the table 3, this table being provided with a transverse opening in which the belt is located. As the ears are advanced by the main conveyor they will be received by the transverse conveyor 19 and moved endwise into contact with the gaging devices, this transverse movement taking place without any interruption of the forward movement of the ears by the main conveyor. If desired, suitable means may be provided for holding the ear firmly in contact with the transverse conveyor during the placing operation and in the present machine I have arranged above the transverse conveyor a roller 22 which, as here shown, is arranged above the outer drum 20 of the transverse conveyor and is carried by a shaft 23 journaled in an elongated bearing or sleeve 24 which is carried by an arm 25 which, in turn, is rigidly secured to a sleeve 26 which is journaled on the shaft 15 of the gaging roller 14, so that the bearing sleeve 24 and roller 22 may have movement in substantially a vertical plane to permit the roller to be lifted by and to rest upon the ear, the forward end of the roller being tapered to permit the ear to engage the same and impart vertical movement thereto. The roller 22 is positively rotated by means of a sprocket chain 27 which extends about a sprocket wheel 28 on the shaft 23 and a sprocket wheel 29 on the shaft 15. If desired husk loosening devices may be mounted adjacent to the rollers 22 and I have here shown flat springs 51 extending above the paths of the ears and provided with spurs or teeth to engage the husks.

The ears of corn are carried to and past the butt removing device and are then delivered to husking rollers 30 arranged beyond the butt removing devices, and in the present machine beneath the table 3, and extending lengthwise of the main frame of the machine. The ears are delivered from the table 3 to the husking rollers partly by gravity and partly by the action of the main conveyor and to this end a curved chute extends from the discharge end of the table 3 to the husking rollers, this chute being curved about the axis of the rear sprocket wheel 11 so that the flights 12 of the conveyor will move through the chute and will carry the ears therefrom onto the husking rollers, and in that form of the device shown in Fig. 2 will positively move the ears throughout the length of the husking rollers. In the present arrangement the discharge end of the table 3 is curved about the axis of the sprocket wheel 11. Cooperating with the curved end of the table is the main chute which comprises a guide plate 31 which extends from a point above the axis of the rear sprocket wheels 11 to a point adjacent to the receiving ends of the husking rollers 30. This guide plate or chute is spaced from the sprocket wheels 11 a distance sufficient to permit of the free movement of the flights 12 through the same. As the ears of corn are moved to the discharge end of the table they will drop into the chute and will move by gravity partially through the same and will be engaged by the flights to complete their movement and deliver the same to the husking rollers. The ears are presented to the butt removing device in a position transverse to the line of their movement and must be turned so as to present them to the husking rollers in a position parallel with the line of their movement. Ordinarily when an ear is moved transversely to its length onto the receiving ends of the husking rollers the action of the rollers on the ear will turn the latter to a position parallel with the rollers. In some cases, however, it may be desirable to provide means for turning the ears before they engage the husking rollers and in the present machine I have provided means for so turning the ear. To accomplish this I have arranged above the table 3 a retarding device, such as a spring 59, which will engage the large or outer end of the ear just as the same passes about the curved discharge end of the table 3 and will so retard the movement of this end of the ear that the point of the ear will drop downwardly into the chute 31 by gravity, thus turning the ear into a position in which it will extend substantially lengthwise of the chute. If the ear does not free itself from the retarding device by its own weight it will be engaged by the following flight 12 of the conveyor and forced out of engagement with the retarding device so as to permit it to continue its movement through the chute. In order to maintain the ear in this position as it travels through the chute the latter is provided with a channel or guideway of a width less than the length of the ear so that after the ear has been turned to its lengthwise position it will be retained in that position until it is delivered to the husking rollers. In the present mechanism which, as has been stated constitutes a double husker, the chute 31 has its intermediate portion extended inwardly, as shown at 32, so as to constitute in effect a partition which divides this chute into two guideways or channels 33 adapted to receive the ears respectively from the two butting devices and to deliver the same to the respective pairs of husking rollers. Ribs 56 may be arranged at the inner edges of the channels to more effectively retain the ears therein. The flights 12 of the main conveyor have their outer edges recessed to conform substantially to the shape of the chute, so that there will be just enough clearance between the same and the wall of the chute to permit the free movement of the conveyor through the chute. As the ears are moved onto the husking rollers they are engaged by a brush 34 which tends to press them firmly into contact with the husking rollers so that the latter will grip the husks and tear the same loose. As here shown, both brushes 34 are mounted on a shaft 35 which is supported in bearing brackets 36 carried by the main frame. This shaft has secured thereto a series of radial fingers 37 which are arranged to be engaged by the flights 12 on the main conveyor and actuated thereby to impart rotatory movement to the brushings. After the ear passes beyond the brush 34 it is moved beneath a plate 38 which is so arranged above the husking rollers that it will retain the ear in proper relation thereto as it is moved along the same by the conveyor. By the time the ear reaches the forward end of the husking rollers all the husk has been stripped therefrom and the husked ear is discharged through a chute 39.

The husking rollers may be of any suitable character but, as here shown, each roller is made up of a series of sections 40, each section being provided with longitudinal ribs or corrugations. The adjacent ends of the sections of each roller are spaced apart and in one roller the spaces between the adjacent sections form circumferential grooves 41 while on the other roller toothed wheels 42 are mounted in these spaces and project slightly beyond the periphery of the roller so as to enter the corresponding grooves 41 in the companion roller, thus serving to loosen the husk so that it can be more readily gripped by the rollers.

It will be obvious that the husking rollers may be arranged in any suitable manner and in Fig. 7 I have shown the same as sloping downwardly from the discharge end of the chute 31 so that the ears of corn will be caused to move along the husking rollers by gravity. In this instance a brush 43 is arranged above the husking rollers to press the ears into firm engagement therewith and is preferably positively rotated by connection with a suitable part of the driving mechanism, the driving connection not being here shown.

In Figs. 8 and 9 I have shown another arrangement of the husking mechanism in which the longitudinally extending husking rollers 30 are arranged in an inclined position so that the ears will move along the same by gravity, but in this instance I have interposed between the longitudinal husking rollers and the chute a pair of transversely extending husking rollers across which the ears will be moved transversely, in the present instance by the main conveyor. In this form of the mechanism the chute leading from the butt removing device to the husking rollers, as shown at 44, is of uniform depth so that the ears will move through the same transversely to their length. The lower portion of the chute is extended to form a table 45 which is provided with a transverse opening in which are arranged a pair of husking rollers, 46, extending transversely to the direction of movement of the conveyor 9 and which may be operated from any suitable part of the driving mechanism. The brush 47 arranged above the husking rollers 46 presses the ear into firm engagement therewith to enable the rollers to grip the husk and remove it from the ear. These rollers, however, will strip only the coarse outer husk from the ear and the longitudinal rollers 30 are relied upon to remove the remainder of the husk. The ear moves over the husking rollers 46 onto the forward end of the table 45 and are delivered from that table onto the husking rollers 30. As the ears move from the transverse rollers onto the longitudinal rollers they will be turned into positions parallel with the longitudinal rollers. In that form of the device here illustrated I have provided means acting on the ears to cause the same to turn. For this purpose I have cut away the intermediate portion of the table 45 and have depressed the same to form a guide or chute 48. As the ear is advanced beyond the upper end of the chute 48 one end of the ear will drop down that chute but the other end of the ear will be held against downward movement by the side portion or flange of the table thus causing the ear to turn and move down the chute endwise. If desired, means may be provided for retarding one end of the ear and in the present machine I have arranged above the horizontal outer portion of the table 45 a retarding device 49 which is preferably in the form of a yieldable arm and which engages the large outer end of the ear to retard its movement. The retarding device is so arranged that it will engage the ear just as the inner portion of the ear moves over the cut-away portion of the table. Consequently the point of the ear will drop down the chute 48 by gravity, and, due to the retarding action of the arm 49 on the outer end of the ear, the ear will turn into a longitudinal position and will be delivered to the husking rollers 30 in that position. A guide strip 50 extends along the husking rollers 30 to retain the ears in proper position thereon.

The operation of the mechanism will be apparent from the foregoing description and it will be understood that when the machine is in operation an ear of corn is placed on the table 3 in advance of each flight 12 of the main conveyor, with its butt end outward. Where the mechanism is embodied in a double husker there will, of course, be two ears placed in advance of each flight, one at each side of the table and each with its butt end outward. As the conveyor advances the ear is moved transversely to its length onto the transverse conveyor 19 which moves the butt end thereof into contact with the gaging device which properly positions the same with relation to the butt removing device so that the further movement of the ear by the main conveyor will move the same past the butt removing device and cause the butt to be removed therefrom. After the butt has been removed the ear will be delivered to the chute 31 and in that form of the mechanism shown in Figs. 1 and 2 will be turned so that it will move lengthwise through the chute and onto the husking rollers. In that form of the device shown in Fig. 8 the ear is not turned until it has passed through the main chute and across the transverse husking rollers after which it is turned and presented lengthwise to the longitudinal husking rollers, but in each instance the ear is turned after it passes the butt removing device and before it is presented to the longitudinal husking rollers.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In a corn husking machine, a butt removing device, a pair of husking rollers arranged below said butt removing device and extending lengthwise of said machine, a single conveyor for moving an ear of corn transversely to its length past said butt removing device and along said husking rollers, and means interposed between said butt removing device and said husking rollers for turning said ear and causing the same to be presented to said husking rollers in a position substantially parallel therewith.

2. In a corn husking machine, a butt removing device, a pair of husking rollers arranged below said butt removing device and extending lengthwise of said machine, a chute to receive an ear of corn from which the butt has been removed and deliver the same to said husking rollers, means for moving said ear of corn transversely to its length to said butt removing device and to said chute, and means for turning said ear to a position in which it will extend lengthwise of the line of its movement.

3. In a corn husking machine, a butt removing device, a pair of husking rollers arranged below said butt removing device and extending lengthwise of said machine, a chute to receive an ear of corn from which the butt has been removed and deliver the same to said husking rollers, means for moving said ear of corn transversely to its length to said butt removing device and to said chute, and means for retarding the movement of one end of said ear to cause the same to assume a position in which it extends lengthwise of said line of movement.

4. In a corn husking machine, a butt removing device, a pair of husking rollers arranged below said butt removing device and extending lengthwise of said machine, a curved chute to receive an ear of corn from which the butt has been removed and deliver the same to said husking rollers, a conveyor to move said ear transversely to its length to said butt removing device and to deliver the same to said husking rollers, and means to turn said ear after the butt has been removed therefrom and cause the same to be presented to said husking rollers by said conveyor in a position substantially parallel with said husking rollers.

5. In a corn husking machine, a butt removing device, a pair of husking rollers arranged below said butt removing device and extending lengthwise of said machine, a table to support an ear of corn after the butt has been removed therefrom, a conveyor to move an ear of corn transversely to its length to said butt removing device and along said table, a chute leading from said table to said husking rollers, and a retarding device arranged adjacent to said chute to engage one end of said ear and cause the same to be turned into a position substantially parallel with its line of movement.

6. In a corn husking machine, a butt removing device, a pair of husking rollers arranged below said butt removing device and extending lengthwise of said machine, a curved chute to receive an ear of corn from which the butt has been removed and deliver the same to said husking rollers, a conveyor to move said ear of corn transversely to its length to said butt removing device, said conveyor moving through said chute and serving to deliver said ear to said husking rollers, and a device arranged near the upper end of said chute to retard the movement of one end of said ear as the other end moves downward by gravity and thus cause said ear to be turned to a position lengthwise of its line of movement.

7. In a corn husking machine, a butt removing device, a pair of husking rollers arranged below said butt removing device and extending lengthwise of said machine, a curved chute to receive an ear of corn from which the butt has been removed and deliver the same to said husking rollers, a conveyor to move said ear transversely to its length to the butt removing device and to move the same along said husking rollers, means to turn said ear after the butt has been removed therefrom and cause the same to be presented to said husking rollers in a position substantially parallel with said husking rollers, and means acting on said ear as it is moved along said rollers by said conveyor to press the same into firm contact with said rollers.

8. In a corn husking machine, a butt removing device, a pair of husking rollers arranged below said butt removing device and extending lengthwise of said machine, a curved chute to receive an ear of corn from which the butt has been removed and deliver the same to said husking rollers, a conveyor to move said ear transversely to its length to the butt removing device and to move the same along said husking rollers, means to turn said ear after the butt has been removed therefrom and cause the same to be presented to said husking rollers in a position substantially parallel with said husking rollers, a brush rotatably mounted above said husking rollers, and means actuated by said conveyor for rotating said brush.

9. In a corn husking machine, a butt removing device, a pair of husking rollers arranged below said butt removing device and extending lengthwise of said machine, a curved chute to receive an ear of corn from which the butt has been removed and deliver the same to said husking rollers, a conveyor to move said ear transversely to its length to the butt removing device and to move the same along said husking rollers, means to turn said ear after the butt has been removed therefrom and cause the same to be presented to said husking rollers in a position substantially parallel with said husking rollers, a brush rotatably mounted above said husking rollers, substantially radial fingers connected with said brush and arranged to be successively engaged by said conveyor to impart rotatory movement to said brush.

10. In a corn husking machine, a butt removing device, a pair of husking rollers, a conveyor to move ears of corn transversely to their length past said butt removing device and lengthwise along said husking rollers, and a yieldable member rotatably supported above said husking rollers on an axis transverse to said husking rollers and arranged to engage the ears and press them into firm engagement with said rollers as they are moved along the same by said conveyor.

11. In a corn husking machine, a butt removing device, a pair of husking rollers, a conveyor to move ears of corn past said butt removing device and lengthwise of said husking rollers, a yieldable member rotatably supported above said husking rollers and arranged to engage the ears and press them into firm engagement with said rollers as they are moved along the same by said conveyor, and means actuated by said conveyor for rotating said rotatable member.

12. In a corn husking machine, a butt removing device, a pair of husking rollers, a conveyor to move ears of corn past said butt removing device and lengthwise of said husking rollers, a yieldable member rotatably supported above said husking rollers and arranged to engage the ears and press them into firm engagement with said rollers as they are moved along the same by said conveyor, and a guide extending lengthwise of said husking rollers beyond said rotatable member to retain the ears in proper relation to said husking rollers.

13. In a corn husking machine, a butt removing device, a pair of husking rollers arranged below said butt removing device and extending lengthwise of said machine, a curved chute extending from said butt removing device to said husking rollers and having a channel of a width less than the length of said ear, a conveyor to move said ear transversely to its length to said butt removing device and deliver the same to said chute, and a device arranged near the upper end of said chute to turn said ear and cause it to move lengthwise through the channel in said chute to said husking rollers.

14. In a corn husking machine, a butt removing devices arranged at the respective sides of said machine, a pair of husking rollers associated with and arranged below each of said butt removing devices and extending lengthwise of said machine, a curved chute leading from said butt removing devices to said husking rollers and having separate channels formed therein to receive the ears from the respective butt removing devices, a conveyor to move the ears transversely of their length past said butt removing devices and to said chute, and means for turning said ears to cause them to move through the respective channels in the direction of their length.

15. In a corn husking machine, butt removing devices arranged at the respective sides of said machine, a pair of husking rollers associated with and arranged below each of said butt removing devices and extending lengthwise of said machine, a curved chute extending from said butt removing devices to said husking rollers, said chute having a portion substantially midway between the lateral edges thereof bent inwardly to form a partition and having its lateral portions shaped to provide channels between the same and the inwardly bent portion of said chute, an endless conveyor comprising transverse flights to move the ears of corn transversely to their length past said butt removing device to said chute, and means for turning said ears as they enter said chute to cause the same to move through the respective channels in the direction of their length.

16. In a corn husking machine, butt removing devices arranged at the respective sides of said machine, a pair of husking rollers associated with and arranged below each of said butt removing devices and extending lengthwise of said machine, a curved chute extending from said butt removing devices to said husking rollers, said chute having a portion substantially midway between the lateral edges thereof, bent inwardly to form a partition and having its lateral portion shaped to provide channels between the same and the inwardly bent portion of said chute, and a conveyor comprising transverse flights movable past said butt removing devices, through said chute and to said husking rollers, said flights being shaped to conform substantially to the contour of said chute, and means for turning the ears to cause the same to move through the respective channels in said chute in the direction of their lengths.

17. In a corn husking machine, a butt removing device, a pair of husking rollers arranged below said butt removing device and extending lengthwise of said machine, a curved chute to receive an ear of corn from which the butt has been removed and deliver the same to said husking rollers, said chute having portions of its curved wall bent inwardly to provide the same with a longitudinal channel through which the ear moves, a conveyor comprising transverse flights arranged to move past said butt removing device and through said chute, said flights having recesses in the outer edges thereof to conform them to the contour of the wall of said chute, and means for turning the ear to cause it to move through said channel in the direction of its length.

18. In a corn husking machine, a butt removing device, a pair of husking rollers arranged below said butt removing device and extending lengthwise of said machine, a chute to convey the ears from said butt removing device to said husking rollers, a pair of transversely extending husking rollers arranged in advance of said longitudinal husking rollers, a conveyor to move the ears of corn past said butt removing device, over said transverse husking rollers and deliver the same to said longitudinal husking rollers, and means for turning the ear after it has passed said transverse husking rollers to cause it to be presented to said longitudinal husking rollers in a position parallel therewith.

19. In a corn husking machine, a butt removing device, a pair of husking rollers arranged below said butt removing device and extending lengthwise of said machine, a chute to convey the ears from said butt removing device to said husking rollers, a pair of transversely extending husking rollers arranged in advance of said longitudinal husking rollers, a conveyor to move the ears of corn past said butt removing device, over said transverse husking rollers and deliver the same to said longitudinal husking rollers, a supplemental chute leading from said main chute beyond said transverse husking rollers, said main chute having a horizontal portion extending alongside of said supplemental chute, and a retarding device to engage the end of the ear above the horizontal portion and cause the ear to be turned as the other end of said ear moves down said supplemental chute.

20. In a corn husking machine, a butt removing device, a pair of husking rollers arranged beyond said butt removing device and extending lengthwise of said machine, a chute to convey ears of corn from said butt removing device to said husking rollers, a conveyor to move ears of corn past said butt removing device and deliver the same to said husking rollers, said chute having at that end thereof adjacent to said husking rollers a lateral portion extending forwardly beyond the end of the chute and adapted to support one end of the ear after the body of the ear has passed the end of the chute, thereby causing the ear to turn and to be delivered to the husking rollers in a position lengthwise thereof.

21. In a corn husking machine, a butt removing device, a pair of husking rollers arranged beyond said butt removing device and extending lengthwise of said machine, a chute to convey the ears from said butt removing device to said husking rollers, a pair of transversely extending husking rollers arranged in advance of said longitudinal husking rollers, a conveyor to move the ears of corn past said butt removing device, over said transverse husking rollers and deliver the same to said longitudinal husking rollers, a supplemental chute leading from said main chute beyond said transverse husking rollers, said main chute having a horizontal portion extending alongside of said supplemental chute, to support one end of the ear and cause the same to be turned as the other end thereof moves down said supplemental chute.

22. In a corn husking machine, a butt removing device, a gaging device arranged adjacent to said butt removing device to position the ear with relation thereto and comprising a vertically yieldable gaging roller having a spiral rib to advance the butt of the ear, a pair of husking rollers arranged below said butt removing device and extending lengthwise of said machine, a chute leading from said butt removing device to said husking rollers, a conveyor to move the ear of corn past said butt removing device and deliver the same to said chute, and a placing device to move the ear transversely of said conveyor and into engagement with said gaging device.

23. In a corn husking machine, a butt removing device, a gaging device arranged adjacent to said butt removing device and comprising a normally stationary gaging bar, a vertically yieldable spiral roller arranged above said gaging bar and cooperating therewith, a pair of husking rollers arranged below said butt removing device and extending lengthwise of said machine, a chute leading from said butt removing device to said husking rollers, a conveyor to move the ear of corn past said butt removing device and deliver the same to said chute, and a placing device to move the ear transversely of said conveyor and into engagement with said gaging device.

24. In a corn husking machine, a butt removing device, a conveyor to move an ear of corn transversely to its length toward said butt removing device, a gaging device comprising a normally fixed gaging bar, a spiral roller yieldably mounted above said gaging bar and cooperating therewith, and a transverse conveyor to engage said ear as it is advanced by the first mentioned conveyor and move the butt end thereof into engagement with the gaging device.

25. In a corn husking machine, a butt removing device, a pair of husking rollers located near said butt removing device and extending lengthwise of said machine, a single conveyor for moving an ear of corn transversely to its length to and past said butt removing device and along said husking rollers, and means for turning said ear after the butt has been removed therefrom and causing the same to be presented to said husking rollers in a position substantially parallel therewith.

26. In a corn husking machine, a butt removing device, a pair of husking rollers arranged beyond said butt removing device and extending lengthwise of said machine, means for moving an ear of corn transversely to its length to and past said butt removing device, and means for retarding the movement of one end of said ear of corn after it has passed said butt removing device, thereby causing the ear to turn and be presented to said husking rollers in a position lengthwise thereof.

27. In a corn husking machine, a butt removing device, a pair of husking rollers arranged beyond said butt removing device and extending lengthwise of said machine, a chute to receive an ear of corn from said butt removing device and deliver the same to said husking rollers, means for moving said ear of corn transversely to its length to said butt removing device and to said chute, and means for causing said ear to turn after it has passed said butt removing device so that it will be presented to said husking rollers in a position lengthwise thereof.

28. In a corn husking machine, a butt removing device, a pair of husking rollers arranged beyond said butt removing device and extending lengthwise of said machine, a chute to receive an ear of corn from said butt removing device and deliver the same to said husking rollers, means for moving said ear of corn transversely to its length to said butt removing device and to said chute, and a device to engage one end of said ear of corn and retard the movement thereof as the other end of said ear is advanced, thereby causing the ear to turn into a position substantially parallel with its line of movement.

29. In a corn husking machine, a butt removing device, a pair of husking rollers arranged near said butt removing device, means to guide the ears from said butt removing device to said husking rollers, a pair of transversely extending husking rollers arranged in advance of said longitudinal husking rollers, a conveyor to move ears of corn past said butt removing device, over said transverse husking rollers and to deliver the same to said longitudinal husking rollers, and means for turning the ear after it has passed said transverse husking rollers to cause it to be presented to said longitudinal husking rollers in a position parallel therewith.

30. In a corn husking machine, a butt removing device, a conveyor to move an ear of corn transversely to its length and past said butt removing device, a gaging device comprising a normally fixed gaging bar, a spiral roller yieldably mounted above said gaging bar and cooperating therewith, and means to engage said ear as it is advanced by the first mentioned conveyor and move the butt end thereof into engagement with the gaging device.

31. In a machine for husking two files of ears of corn, the combination of two butt removing devices and means located between the two butt removing devices for carrying the ears in adjacent parallel files to and beyond the respective butt removing devices, of two pairs of husking rollers located lengthwise of said machine, means for causing the ears of one file to be delivered to one pair only of the husking rolls and the ears of the other file to be delivered to the other pair only of said rollers.

32. In a machine for husking two files of ears of corn, the combination of two butt removing devices and means located between the two butt removing devices for carrying the ears in adjacent parallel files to and beyond the respective butt removing devices, of two pairs of husking rollers located lengthwise of said machine, means for causing the ears of one file to be delivered to one pair only of said husking rolls and the ears of the other file to be delivered to the other pair only of said husking rolls, and means for turning the ears so they will be presented lengthwise with the said husking rolls.

33. In a machine for husking two files of ears of corn, the combination of two butt removing devices and means located between the two butt removing devices for carrying the ears in adjacent parallel files transversely to and beyond the respective butt removing devices, of two pairs of husking rollers located lengthwise of said machine, means for causing the ears of one file to be delivered to one pair only of said husking rolls and the ears of the other file to be delivered to the other pair only of said husking rolls, and means for retarding the movement of one end of each ear to cause the same to assume a position in which it extends lengthwise of its line of movement.

34. In a corn husking machine, a pair of husking rollers arranged lengthwise of said machine, a second pair of husking rollers arranged in advance of and extending transversely to said longitudinal husking rollers, and means for moving ears of corn over said transverse husking rollers to said longitudinal husking rollers.

35. In a corn husking machine, a pair of downwardly and forwardly inclined husking rollers arranged lengthwise of said machine, a second pair of husking rollers arranged in advance of and extending transversely to said longitudinal husking rollers, and means for moving an ear of corn over said transverse husking rollers and delivering the same to the upper ends of said longitudinal husking rollers.

36. In a machine for husking two files of ears of corn, two butt removing devices, means for moving ears of corn in parallel files past the respective butt removing devices, two pairs of husking rollers arranged longitudinally of said machine to receive the ears from the respective butt removing devices, a single pair of husking rollers arranged in advance of and extending transversely to the two pairs of longitudinal husking rollers to act on the ears of corn of both files before they are delivered to the respective pairs of longitudinal husking rollers.

37. In a machine for husking two files of ears of corn, two butt removing devices, means for moving ears of corn in parallel files past the respective butt removing devices, two pairs of husking rollers arranged longitudinally of said machine to receive the ears from the respective butt removing devices, a pair of transverse husking rollers arranged in advance of said longitudinal husking rollers to act on the ears of both files before they are delivered to said longitudinal husking rollers, and means for turning the ears after they have been acted on by said transverse husking rollers to cause them to be delivered to the respective longitudinal husking rollers in positions parallel therewith.

38. In a corn husking machine, a butt removing device, a pair of husking rollers arranged below the level of said butt removing device and extending lengthwise of said machine, a second pair of husking rollers arranged in advance of and extending transversely to said longitudinal husking rollers, means for delivering an ear of corn from said butt removing device to said transverse husking rollers in a position parallel with said transverse husking rollers, and means acting on said ear after it is moved past said transverse husking rollers to cause it to be presented to said longitudinal husking rollers in a position parallel therewith.

39. In a corn husking machine, a butt removing device, a conveyor to move ears of corn past said butt removing device, a pair of husking rollers arranged beneath said conveyor, extending lengthwise of said machine and inclined downwardly and forwardly to cause said ears of corn to move along the same by gravity, and means for delivering ears from said butt removing device to the upper ends of the inclined husking rollers.

40. In a corn husking machine, a butt removing device, a pair of husking rollers extending lengthwise of said machine, a curved chute to receive an ear of corn from which the butt has been removed and deliver the same to said husking rollers, a conveyor to move said ear of corn transversely to its length to said butt removing device, said conveyor moving through said chute and serving to deliver said ears to said husking rollers.

41. In a corn husking machine, a butt removing device, a pair of husking rollers arranged below said butt removing device and extending lengthwise of said machine, and a single conveyor for moving an ear of corn transversely to its length past said butt removing device and moving the same onto said husking rollers.

42. In a corn husking machine, a butt removing device, a pair of husking rollers arranged below the level of said butt removing device and extending lengthwise of said machine, a pair of transversely extending husking rollers arranged in advance of said longitudinal husking rollers, and means for moving an ear of corn past said butt removing device and causing the same to be delivered successively to said pairs of husking rollers.

43. In a machine for husking two files of ears of corn, two gaging devices, two butt removing devices, means for moving ears of corn in parallel files past the respective butt removing devices, two belts moving transversely in opposite directions to move said ears of corn toward said gaging devices, two pairs of inclined husking rollers arranged longitudinally of said machine to receive the ears from the respective butt removing devices, and a pair of transverse husking rollers arranged in advance of said longitudinal husking rollers.

44. In a corn husking machine, a butt removing device, a conveyor to move an ear of corn transversely to its length toward said butt removing device, a gaging device comprising a normally fixed gaging bar and a yieldable member mounted above said gaging bar and cooperating therewith, a belt moving transversely of said machine toward said gaging device, and a yieldable member cooperating with said transversely moving belt to engage an ear as it is advanced by said conveyor to move the butt end thereof into engagement with said gaging device.

45. In a machine for husking two files of ears of corn, two gaging devices, two butt removing devices, two belts moving in opposite directions for moving ears of corn transversely of the machine toward the respective gaging devices, means for moving ears of corn in parallel files past the respective gaging devices and past the butt removing devices, and a pair of husking rollers extending transversely across the machine to receive and husk the ears from said butt removing devices.

46. In a corn husking machine, a gaging device, a butt removing device, a belt for moving ears of corn transversely of the machine toward said gaging device, means for moving ears of corn past said gaging device and past said butt removing device, and a pair of husking rollers arranged longitudinally of said machine to receive the ears from said butt removing device.

47. In a machine for husking two files of ears of corn, two gaging devices, two butt removing devices, two belts moving in opposite directions for moving ears of corn transversely of the machine toward the respective gaging devices, means for moving ears of corn in parallel files past the respective gaging devices and butt removing devices, and two pairs of inclined husking rollers arranged longitudinally of said machine to receive the ears from the respective butt removing devices.

48. In a machine for husking two files of ears of corn, two gaging devices, two butt removing devices, two belts moving in opposite directions for moving ears of corn transversely to the machine toward the respective gaging devices, means for moving ears of corn in parallel files past the respective gaging devices and past the butt removing devices, inclined husking rollers mounted beyond said butt removing devices, and horizontal husking rollers arranged in advance of and extending transversely to said inclined husking rollers.

49. In a corn husking machine, a butt removing device, a conveyor to move an ear of corn transversely to its length toward said butt removing device, a husk loosening device to act on said ear of corn while it is being advanced by said conveyor, a gaging device comprising a stationary lower member and a yieldable upper member mounted for vertical movement toward and from the lower member, said members being spaced apart to receive between them a stem of an ear of corn, a belt moving transversely to said machine toward said gaging device, and a yieldable member cooperating with said transversely moving belt to engage said ear as it is advanced by said conveyor and move the end thereof into engagement with said gaging device.

50. In a corn husking machine, two butt removing devices, two pairs of husking rollers arranged below the level of said butt removing devices and extending lengthwise of said machine, and a single conveyor to move ears of corn transversely to their length past both butt removing devices and cause said ears to be delivered to said husking rollers.

51. In a corn husking machine, two butt removing devices, two pairs of inclined husking rollers arranged below the level of said butt removing devices, extending lengthwise of said machine and along which the ears of corn may move by gravity, and a conveyor for moving ears of corn transversely to their length past said butt removing devices and delivering the same to the upper ends of said husking rollers.

52. In a corn husking machine, a butt removing device, a pair of husking rollers arranged below the level of said butt removing device to receive ears of corn therefrom and extending lengthwise of said machine, a convayor having its lower stretch arranged above said husking rollers and provided with flights to move said ears of corn along said rollers, and means arranged above the flights of the lower stretch of said conveyor to retain said ears on said husking rollers in positions to be operatively engaged by said flights.

Signed at Morral, Ohio, this 24 day of April, 1929.

WILLIAM W. MORRAL.